No. 676,524. Patented June 18, 1901.
W. H. ABBEY & J. ALTMOS.
ELECTRODE FOR SECONDARY BATTERIES.
(Application filed Aug. 25, 1900.)
(No Model.)
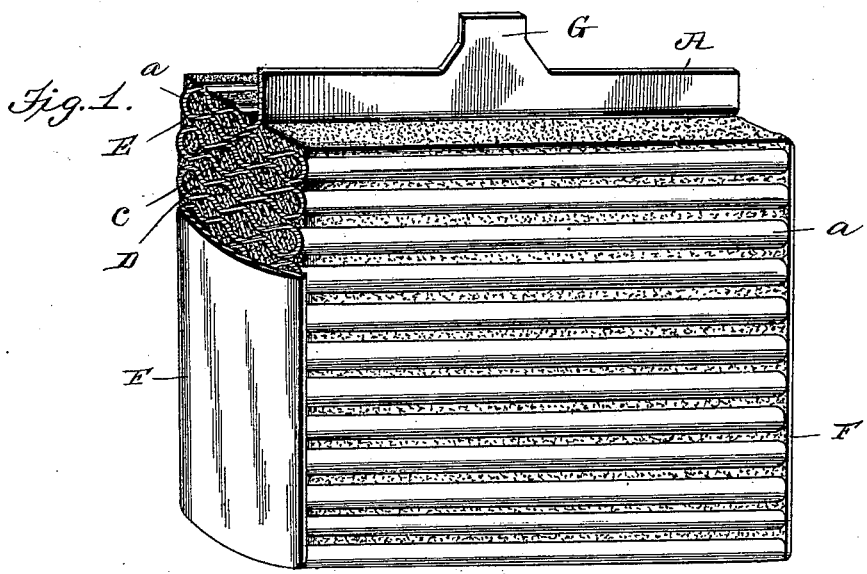
Fig. 1.
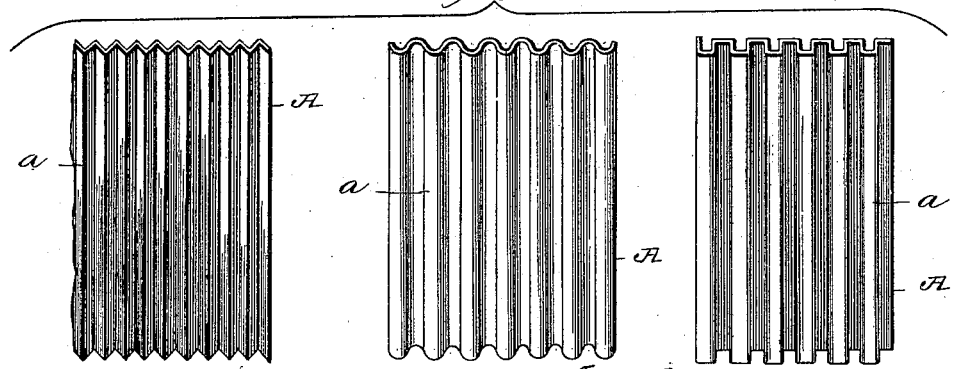
Fig. 2.
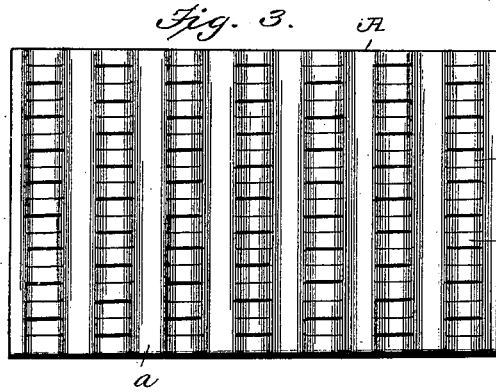
Fig. 3.
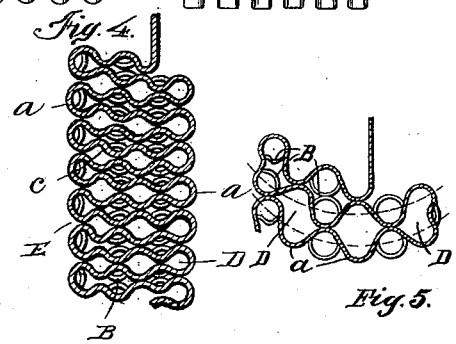
Fig. 4.
Fig. 5.
Witnesses
E. W. Hart
Chas. W. Parker
Inventors
W. H. Abbey and
Jacob Altmos.
By Milo B. Stevens & Co
Attorneys

UNITED STATES PATENT OFFICE.

WILSON H. ABBEY AND JACOB ALTMOS, OF CLEVELAND, OHIO.

ELECTRODE FOR SECONDARY BATTERIES.

SPECIFICATION forming part of Letters Patent No. 676,524, dated June 18, 1901.

Application filed August 25, 1900. Serial No. 27,988. (No model.)

*To all whom it may concern:*

Be it known that we, WILSON H. ABBEY and JACOB ALTMOS, citizens of the United States, residing at Cleveland, in the county of Cuyahoga and State of Ohio, have invented certain new and useful Improvements in Electrodes for Storage or Secondary Batteries; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to electrodes for storage or secondary batteries, and is embodied in the novel construction of electrode hereinafter described, and particularly set forth in the claims.

It is one object of the invention to provide an electrode for secondary batteries which will provide a light but strong and effective carrier or holder for the active material and one which will expose the largest possible amount of the active material to the action of the battery fluid consistent with lightness and a comparatively small amount of the conductive material of which the holder is composed.

A further object of the invention is to so construct the holder for the active material that the same can be made of light sheet material and yet not buckle, but will retain its shape and hold the active material effectively in the battery and prevent its falling away from the holder.

A further object is to provide a holder for the active material formed with a number of shelves or partitions slightly spaced apart, forming compartments for the active material, and provide the said partitions with means which will prevent their sagging or approaching each other too closely.

A further object of the invention is to provide an exceedingly simple and cheap electrode which can be readily and easily made and will at the same time be highly efficient and desirable.

We have shown in the accompanying drawings an electrode embodying our invention; but it will be understood that we do not limit the invention in its useful applications to the particular construction which for the sake of illustration we have therein delineated.

In the drawings, Figure 1 is a perspective view, partly broken away, of an electrode embodying our invention. Fig. 2 is a plan view of a sheet of metal of which the holder for the active material is made, showing the same crimped or corrugated. Fig. 3 is a similar view of the crimped or corrugated sheet provided with perforations and the spans. Fig. 4 is a vertical transverse sectional view through the completed electrode. Fig. 5 is a sectional view through a portion of the holder with the active material removed.

Referring to the drawings, A represents a thin sheet of suitable conductive material adapted for the purpose of holding the active material in the battery solution of a secondary or storage battery and is preferably made of pure sheet-lead. As will be seen, the sheet is provided with a series of parallel corrugations, crimps, or ribs, (indicated at $a$,) which are formed in any convenient manner, as by means of corrugated rollers or dies. The shape of the crimp is not essential and may be, as shown in Fig. 2, rounded, squared, or angular or of other form. The corrugated or crimped sheet is also provided, as will be seen in Fig. 3, with small spans or portions B, which are punched or otherwise formed from the sheet and, as will be seen, span or bridge the alternate channels or furrows made in the sheet by the crimps or corrugations. These spans being struck or punched up from the sheet of metal provide wide and ample openings for the passage of the battery fluid without weakening the sheet. In fact, they materially strengthen the sheet and aid in retaining the same in the shape to which it is bent, as will be hereinafter described. The sheet A, crimped or corrugated, as above described, and provided with the spans B, is folded or bent in zigzag form to form a pile of shelves or partitions C, forming between them compartments D, alternately open at opposite sides for their full length to the free entrance of the battery fluid to the active material, which is confined and supported between the shelves or partitions and which is indicated at E. This material may be any known active material suitable for the purpose—such, for instance, as peroxid of lead.

It will be observed that the shelves or partitions C of the electrode, besides being crimped or corrugated, are also curved or bent between their sides for their full length in substantially trough form, as plainly indicated in the sectional views. This curving or bending of the several shelves or partitions effectually prevents the buckling or displacement of the several shelves. The spans B of one shelf or partition, it will be noticed, contact with the spans or other parts of the adjacent partition or shelf, thus materially aiding in retaining the shelves suitably spaced and in their proper relative position. The holes made by the formation of the spans, as has been before stated, afford ready access for the battery fluid to the active material between the partitions.

After the electrode-holder has been constructed in the manner above set forth the opposite ends of the stack of shelves or partitions C are dipped into molten lead, which retains the ends of the shelves in their relative position and materially strengthens the holder and acts in conjunction with the spans to support the shelves spaced apart. This end-holding means is indicated at F. It will be readily understood that the ends may be closed in other manner; but that described is an efficient and satisfactory one.

The lowermost shelf, which constitutes, in effect, the bottom of the electrode, is not perforated, thus preventing the sifting of the active material therethrough.

G indicates the end of the sheet, which is suitably fashioned for connection to a suitable pole-piece or binding-post or support for the electrode.

We are aware that it is old to form the support for the active material with crimps or corrugations and to bend the same into zigzag form and to provide a series of such bends with side closing-plates which are perforated, and make no claim to such construction.

What we claim as new, and desire to secure by Letters Patent, is—

1. An electrode for storage batteries comprising a holder for the active material formed of a corrugated sheet, said sheet being bent parallel with the corrugations to form a series of shelves or partitions each having a plurality of corrugations extending longitudinally of the shelves and parallel with the sides thereof, the spaces between the shelves being alternately open at opposite sides to the free admission of the battery fluid, and supporting and closing means for the shelves and spaces between the shelves.

2. An electrode for storage batteries comprising a holder for the active material formed of a corrugated sheet bent to form separated compartments open at opposite sides, said sheets being provided with spans B formed from the sheet and spanning channels made by the corrugations, substantially as and for the purpose described.

3. An electrode for storage batteries, comprising a holder for the active material, formed of a corrugated sheet bent to form a series of substantially parallel shelves provided with spans B formed from the sheet and spanning channels made by the corrugations, said shelves each being bent or curved in cross-section, substantially as described.

4. An electrode for storage batteries, comprising a holder for the active material, formed of a sheet provided with corrugations $a$ and the spans B formed from the sheet and spanning channels formed by the corrugations, substantially as described.

5. An electrode for storage batteries, comprising a holder for the active material formed of a sheet bent or folded in zigzag form to provide a series of shelves or partitions, each shelf or partition having a plurality of longitudinal corrugations, the alternate channels formed by the corrugations having spans B, formed from the sheet and crossing the channels, and an active material supported by said holder between the shelves or partitions, substantially as described.

In testimony whereof we affix our signatures in presence of two witnesses.

WILSON H. ABBEY.
JACOB ALTMOS.

Witnesses:
HARRY G. BATCHELOR,
JOHN A. BOMMHARDT.